(12) United States Patent
Niggemann

(10) Patent No.: US 9,862,009 B2
(45) Date of Patent: Jan. 9, 2018

(54) CLEANING OF PRESS PLATES OR ENDLESS PRESS BELTS

(71) Applicant: HUECK Rheinische GmbH, Viersen (DE)

(72) Inventor: Ralf Niggemann, Kierspe (DE)

(73) Assignee: HUECK Rheinische GmbH, Viersen (DE)

( * ) Notice: Subject to any disclaimer, the term of this patent is extended or adjusted under 35 U.S.C. 154(b) by 0 days.

(21) Appl. No.: 15/103,808

(22) PCT Filed: Oct. 28, 2014

(86) PCT No.: PCT/EP2014/073043
§ 371 (c)(1),
(2) Date: Jun. 10, 2016

(87) PCT Pub. No.: WO2015/090693
PCT Pub. Date: Jun. 25, 2016

(65) Prior Publication Data
US 2016/0318075 A1    Nov. 3, 2016

(30) Foreign Application Priority Data
Dec. 20, 2013   (DE) .................. 10 2013 114 706

(51) Int. Cl.
B44C 1/22       (2006.01)
B08B 7/00       (2006.01)
B29C 59/04      (2006.01)

(52) U.S. Cl.
CPC .......... *B08B 7/0085* (2013.01); *B08B 7/0042* (2013.01); *B29C 59/04* (2013.01)

(58) Field of Classification Search
CPC ... B08B 7/0042; B08B 7/0085; B08B 7/0057; B08B 7/005; B08B 7/0035; B08B 7/0071
USPC ..................... 216/58, 60, 65, 67; 134/19, 23
See application file for complete search history.

(56) References Cited

U.S. PATENT DOCUMENTS

| 3,742,853 A | * | 7/1973 | Landsman | B23K 26/08 |
| | | | | 101/395 |
| 5,592,879 A | * | 1/1997 | Waizmann | B08B 7/0042 |
| | | | | 101/416.1 |
| 8,182,609 B1 | | 5/2012 | Le Claire et al. | |
| 9,222,874 B2 | * | 12/2015 | Hill | G01N 21/01 |

(Continued)

FOREIGN PATENT DOCUMENTS

DE    4427152 A1    2/1996
DE    19900910 A1   7/2000

(Continued)

OTHER PUBLICATIONS

Office Action for German Application No. DE 102013114706 A1, dated May 28, 2014.

(Continued)

*Primary Examiner* — Lan Vinh
(74) *Attorney, Agent, or Firm* — Collard & Roe, P.C.

(57) ABSTRACT

The invention relates to a method for cleaning a structured surface (1) of a press tool (2), in particular a press plate or an endless press belt, the contaminations on the surface being burnt away by at least one laser beam and combustion residues being subsequently removed from the surface by means of an air or gas stream.

8 Claims, 1 Drawing Sheet

(56) References Cited

U.S. PATENT DOCUMENTS

| | | | |
|---|---|---|---|
| 2002/0088359 A1* | 7/2002 | Liebig | B41C 1/1075 101/425 |
| 2003/0148218 A1* | 8/2003 | Mori | B41C 1/1008 430/273.1 |
| 2004/0168599 A1* | 9/2004 | Riepenhoff | B41C 1/1041 101/467 |
| 2009/0218313 A1* | 9/2009 | Kajiwara | G11B 5/855 216/22 |

FOREIGN PATENT DOCUMENTS

| | | |
|---|---|---|
| DE | 102004037215 A1 | 3/2006 |
| DE | 102008024799 A1 | 11/2009 |
| DE | 202012004375 U1 | 6/2012 |
| EP | 1621263 A1 | 2/2006 |
| WO | WO 2013/113901 A1 | 8/2013 |

OTHER PUBLICATIONS

Search Report for PCT/EP2014/073043, dated Jun. 25, 2015.
Written Opinion for PCT/EP2014/073043, dated Jun. 25, 2015.

* cited by examiner

CLEANING OF PRESS PLATES OR ENDLESS PRESS BELTS

CROSS REFERENCE TO RELATED APPLICATIONS

This application is the National Stage of PCT/EP2014/073043 filed on Oct. 28, 2014, which claims priority under 35 U.S.C. §119 of German Application No. 10 2013 114 706.2 filed on Dec. 20, 2013, the disclosures of which are incorporated by reference. The international application under PCT article 21(2) was not published in English.

BACKGROUND OF THE INVENTION

1. Field of the Invention

The invention relates to a method for cleaning a structured surface of press tools, in particular press plates or endless press belts.

2. Description of the Related Art

Textured large-format press belts (also referred to as endless press belts) and press plates are used to provide substrates such as in particular sheet or strip material with a surface structure for decorative or technical purposes. To this end the surface of the sheet or strip material is imprinted with, for example, a wood structure, a stone structure, or other structures such as pearled, fine stripy surface structures, etc. Such structures are for example regularly used for floor panels. Sheets or strips for the manufacture of, for example, panels for the construction and commercial vehicle industries, are accordingly provided with fairly technical geometric structures such as rhombuses, cells or fluting (in order for example to make them non-slip).

The press belts and plates are usually made from steel and generally have a width of more than a meter and a length of several meters.

The surface structure of said press tools is created by application of a structured etch-resistant mask to the surface to be structured of the press tool and then etching of the masked surface. The etch-resistant mask is usually imprinted on the surface. After etching, the mask is mechanically or electrolytically removed and the surface cleaned. This method is repeated with differently structured masks until the desired final structure is arrived at. As a rule, the structured surface of the tool is then chromium-plated, in order to increase the lifetime of the press tool and to allow easier release (removal of the press tool from the imprinted surface) following imprinting. The structure of the surface of the press tool corresponds to the reversal of the surface structure to be generated on the sheet material.

The cleaning following imprinting and etching of press belts or press plates normally takes place by grinding and use of oil. This removes the etch-resistant mask and etching residues from the structured surface of the press tool. Then the oil used for cleaning and the loosened parts must be removed from the surface without any residues, in order to avoid these causing related flaws in the subsequent steps for manufacturing the press tool. This is performed manually for press belts and for press plates in a washing system using a cleaning agent such as acetone, which is harmful to health and readily vaporises. As a result, it is necessary for personnel to wear, inter alia, breathing masks during cleaning. After use, the cleaning agents have to be disposed of appropriately. Cleaning of the press tools is therefore time-consuming and cost-intensive. A further disadvantage is that cleaning residues may not be completely removed from the surface of the press tool, in particular within the etched structures.

SUMMARY OF THE INVENTION

A problem for the invention is to provide a simpler and more cost-effective cleaning method.

This problem is solved in that contaminations on the surface are burnt away with at least one laser beam and combustion revenues subsequently removed from the surface by means of an air or gas stream.

The method according to the invention has a number of advantages. The cleaning method can be automated, meaning that the number of working hours can be considerably reduced. For the cleaning of the surface neither oil nor other liquid media are required. This means that not only are the costs of purchase and disposal of the liquids saved, but the harmful effects on health and the environment are also eliminated. The cleaning process is also quicker and more thorough. More thorough, because the laser beam is able to burn off etching residues even in the bottom or on the edges of etched structures, where a grinding belt (e.g. a Mikrolon belt) may not be able to reach or only with difficulty. The structures in the surface are not altered, as they can be from the abrasive effect of grinding.

The residues from burning distributed across the surface as dust can be blown away with air or another gas or aspirated. Aspiration has the significant advantage here that the dust is specifically collected.

For cleaning endless press belts the at least one laser beam circulates the surface preferably on a helical path, to which end optionally the endless press belt rotates and the at least one laser generating a laser beam is moved transversally to the direction of rotation of the belt.

In an alternative preferred configuration of the method the surface of the press tool can be traversed in parallel lines. Here optionally only the press plate or the endless press belt or the laser is moved. For this the laser can, for example, be repeatedly displaced transversally to the longitudinal direction of an endless press belt or a press plate from one side across the full width to the other side of the press tool, and then in the longitudinal direction of the press tool, then travelling back across the full width of the press tool. It is generally simpler here if it is the laser itself that travels. But the laser can also be stationary and the press tool moved relative to the laser. Accordingly, the line by line laser method can also follow the longitudinal direction of the press plate or the rotating belt, which is particularly suited to a rotating powered endless press belt.

To this end it is useful if the laser for cleaning a press tool is disposed on a sledge that can be moved transversally to the longitudinal or rotational direction of the press tool.

In order to obtain a particularly thorough cleaning effect, it may be useful if the paths traveled on the surface by the laser beam partially overlap. This allows all fluids to be removed from the surface even if they flow from an uncleaned area into one that has already been cleaned. Neighbouring paths should preferably overlap by at least 10%, more preferably by at least 30% and in individual cases even 50% or more.

It has been shown that a pulsed laser is particularly suited to the burning of oil, paint residues of a mask and of etching residues. With a laser having a power of up to 150 W and a wavelength of 1064 nm very good cleaning results have been achieved.

The method is preferably used in a method for creating a structured surface of an embossing tool, in particular a press plate or press belt, for producing surface structures of sheet and/or strip material, once in fact the surface with a structured mask has been coated and material from the unmasked surface has been removed by etching. The processes of masking, etching and cleaning can be repeated a number of times.

In order to clean a path which is preferably broader than the laser beam, with a laser, there is the possibility of oscillating the laser beam back and forth between the two edges of the path to be cleaned by means of optical elements, wherein the laser head and the surface to be cleaned move simultaneously relative to one another in the direction of the path to be cleaned. In order to achieve at all points of the section of belt to be cleaned the most even heat for burning off the contaminations, it may be useful to allow the laser beam to oscillate in the form of a horizontal 8 across the surface. This avoids different areas of the path being heated to different levels. And it avoids areas on the edges of the path being traversed twice in quick succession by the oscillating laser beam when it is moving linearly back and forth, and being heated to a higher temperature than the central areas where intervals of time between which they are traversed by the laser beam are greater and the distance between the points traversed by the laser is greater in the longitudinal direction of the belt.

BRIEF DESCRIPTION OF THE DRAWINGS

Examples of the method according to the invention are explained below using the figures.

These show as follows.

DETAILED DESCRIPTION OF PREFERRED EMBODIMENTS

Figure 1:
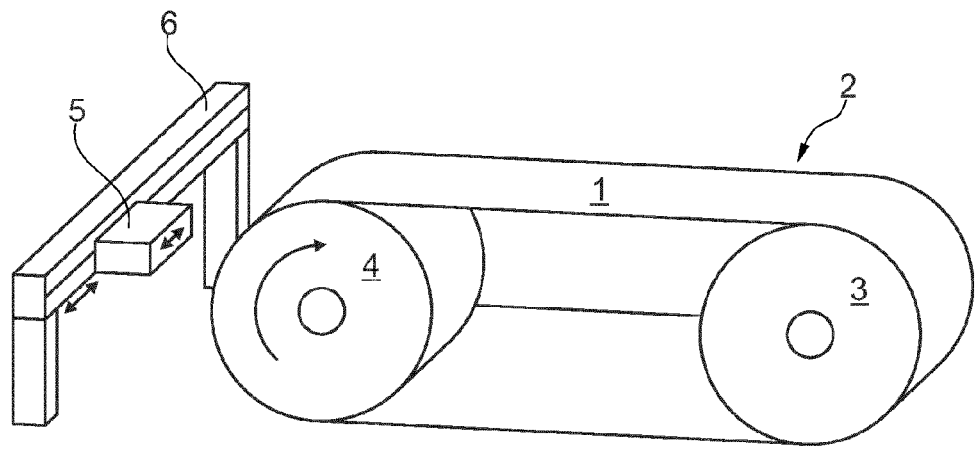
FIG. 1 sketched arrangement of an endless press belt rotating on rollers and a laser head.

FIG. 1 shows a sketched arrangement for cleaning according to the invention of the outer surface 1 of an endless press belt 2, passed over two drums 3, 4. At least one of the drums 3, 4 is driven, so that the press belt can be driven in the direction shown and/or in the opposite direction.

At approximately the level of the plane in which the axes of rotation of the drums 3, 4 are positioned, outside of the press belt a laser head 5 is disposed, which can be moved transversally to the direction of rotation of the endless press belt 2 and parallel to the axes of the drums 3, 4 on a support 6.

The positioning of the laser is controlled by software as a function of the desired gradient of the helical path in the direction transversal to the direction of rotation of the endless press belt.

Figure 2:
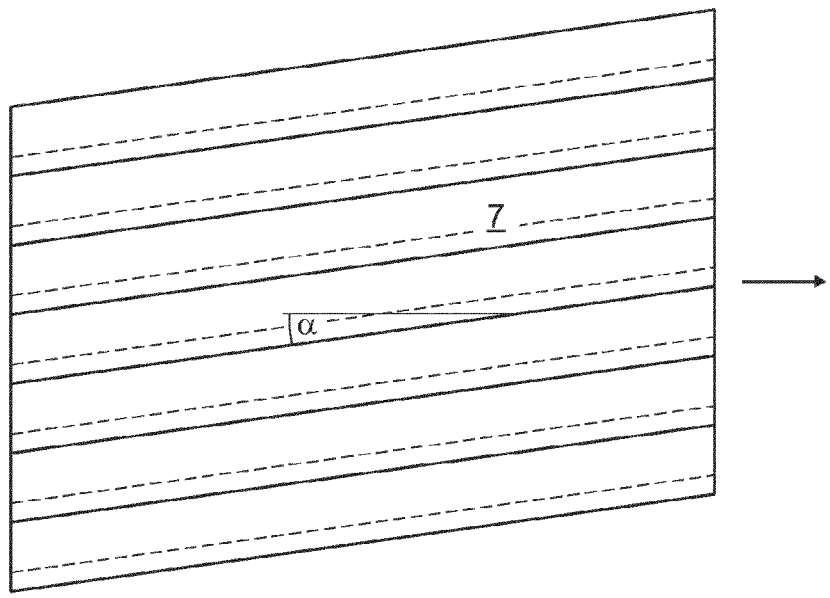
FIG. 2 sketched view of a press belt with a helical path traced on the surface of the press belt.

FIG. 2 shows the edges of a helical path 7 given as an example, along which the laser is moved over the surface of the endless press belt. In the case explained the turns of the helical path overlap. The overlapping front edge of a path is shown as a hatched area. The belt moves in the direction of the arrow. Thus the gradient a of a turn after the endless press belt has rotated once corresponds to the width of the non-overlapped part of a path.

The invention claimed is:

1. A method for cleaning a structured surface of a press tool, in particular a press plate or an endless press belt, the method comprising:
   burning away contaminations on the surface with at least one laser beam without altering structures in the surface, and
   subsequently removing combustion revenues from the surface via an air or gas stream.

2. The method according to claim 1, wherein the combustion residues are aspirated.

3. The method according to claim 1, wherein the at least one laser beam for cleaning an endless press belt circulates the surface on a helical path, to which end the endless press belt and/or a laser generating the laser beam are/is moved.

4. The method according to claim 1, wherein the surface of the press tool of the laser beam is traversed by the laser beam in parallel lines.

5. The method according to claim 1, wherein a laser generating the laser beam for cleaning a press tool is disposed on a sledge that can be moved transversally to the longitudinal or rotational direction of the press tool.

6. The method according to claim 1, wherein the laser beam travels on the surface in partially-overlapping paths.

7. The method according to claim 1, wherein the laser beam is pulsed.

8. A method for creating a structured surface of an embossing tool, having the following steps in the order shown:
   i. masking of the surface with a structured mask;
   ii. etching of the unmasked parts of the surface to create a structured surface;
   iii. cleaning of the structured surface with a method according to claim 1.

* * * * *